UNITED STATES PATENT OFFICE.

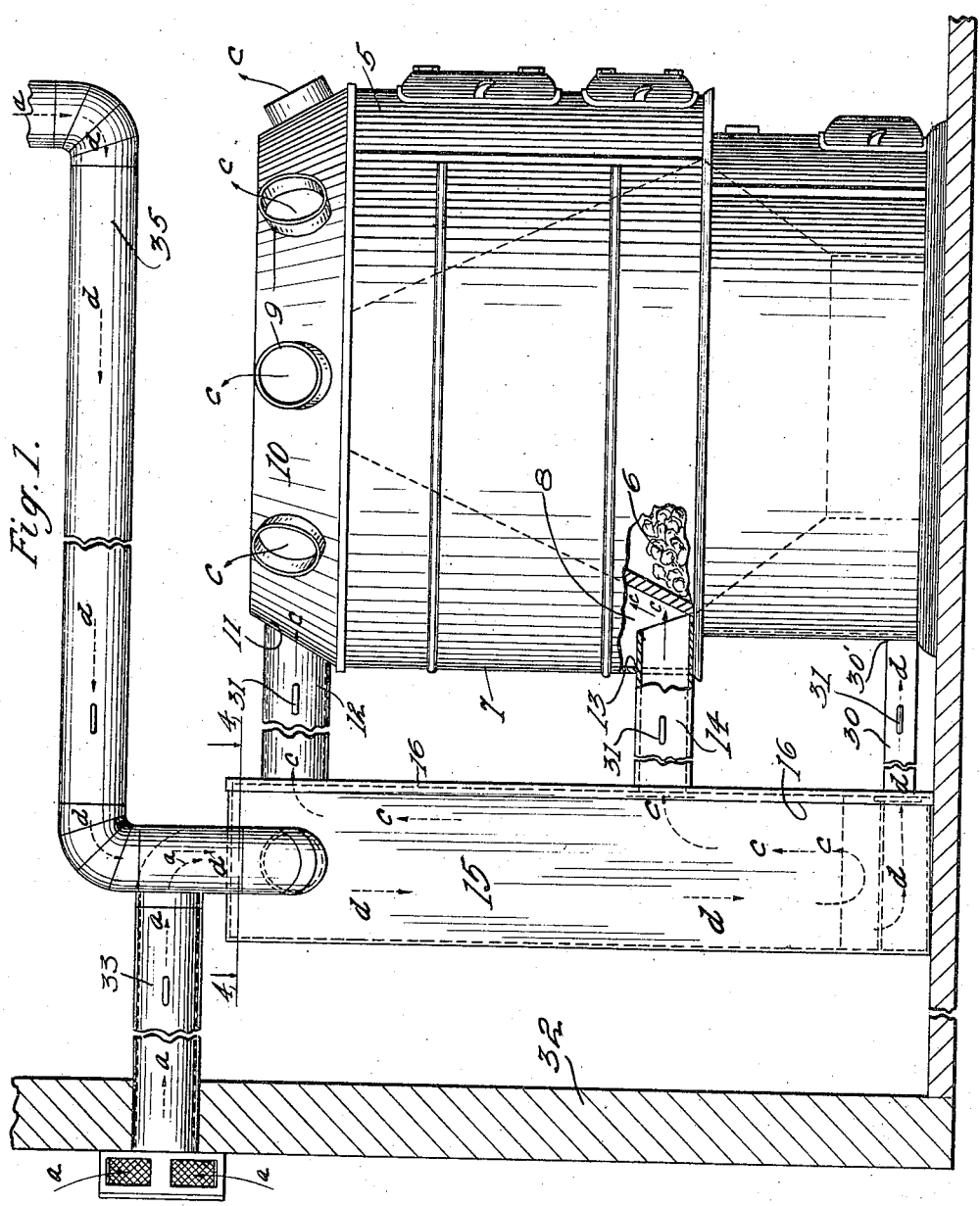

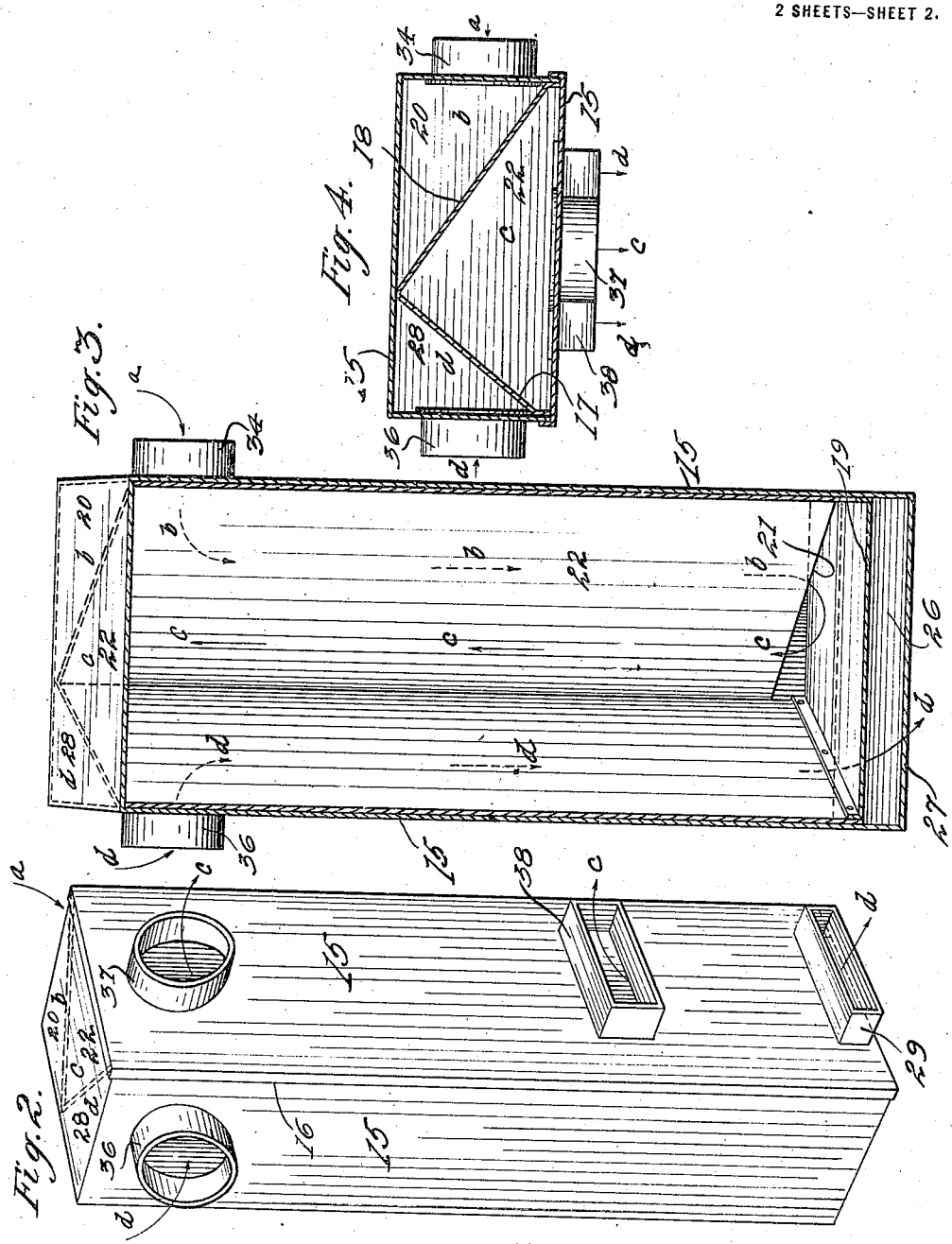

ERASTUS W. WOODS, OF CHICAGO, ILLINOIS.

VENTILATING AND HEATING APPARATUS.

1,242,507.  Specification of Letters Patent.  Patented Oct. 9, 1917.

Application filed February 8, 1915. Serial No. 6,950.

*To all whom it may concern:*

Be it known that I, ERASTUS W. WOODS, a citizen of the United States of America, residing at Chicago, in the county of Cook and State of Illinois, have invented certain new and useful Improvements in Ventilating and Heating Apparatus, of which the following is a specification.

My invention relates to improvements in ventilating and heating apparatus, and the principal objects of my improvement are, first, to provide means whereby to move air along a relatively colder surface in its cycle of movement to facilitate circulation of the air through the apparatus; second, to afford a construction of air inlet means that will oppose or trap the incoming air against reversal of direction of the flow thereof, from any cause, and particularly from the tendency of outside air in motion to "pull" the air outwardly through the apparatus, and consequently waste the heat; third, to produce a construction suitable for introducing atmospheric air to the zone of greatest heat to make more positive the circulation of air through the system; and, fourth, to increase the efficiency of heating and ventilating apparatus of the class described.

With the above and other objects in view, my invention consists in the novel features and in the novel combination and arrangement of parts hereinafter fully described, illustrated in the accompanying drawings forming a part of this specification, and particularly pointed out in the claims hereunto appended, it being understood that changes, variations and modifications in the details of the invention, within the scope of the claims, may be resorted to without departing from the spirit or sacrificing any of the advantages thereof.

Referring to the drawings, Figure 1 is a side elevation of one form of hot air furnace with parts broken away and my improvements in operative relation thereto;

Fig. 2 is a perspective view of an air-receiver or box detached from the furnace and air pipes;

Fig. 3 is a sectional view of the air-box, with the front cover removed and the top of the box leaning forward; and Fig. 4 is a cross-section on the line 4—4 of Fig. 1.

Similar reference numerals indicate similar parts throughout the several views, and the arrows show the direction of movement of the air through the apparatus.

The embodiment selected to illustrate my present invention comprises what is termed an air-receiver or box and the several air ducts, and a source of heat, which may be a furnace or other means of increasing the temperature of the air at any point in its path or in the room or rooms of a building to be ventilated or heated. Under some conditions the heat from human bodies in a room will suffice to set up a circulation of air through the pipes and the rooms.

The furnace 5 is of a common type of hot air furnace, with the usual provision for burning fuel 6, the outer jacket 7 and air-chamber 8 for the expansion and passage of air upwardly and out through the pipes attached to the collars 9. The crown 10 is provided with an opening 11 to receive the open end of the air duct 12, and jacket 7 has an opening 13 therethrough to receive the air duct 14.

What is termed an air-box or receiver 15 is of considerable length and capacity and is vertically positioned and has a plurality of atmospheric air passages parallel to each other with an air trap therebetween and a return-air passage in juxtaposition with the atmospheric air passages and has a cover 16 therefor. The box is formed with partitions 17 and 18 lengthwise thereof and partitions 19 crosswise therein forming chamber 20 for the passage of cold air. The partition 18 is enough shorter than the partition 17 to afford an outlet 21 of sufficient capacity for the passage of incoming air from the chamber 20 to the larger chamber 22. On reference to Figs. 2 and 3, it will appear there are collars 34, 37 and 38 which communicate with the passage 21, and that collar 29' communicates with the passage 26 which is between the partition 19 and the lower end of the box 15.

The passage 26 at its inner end communicates with the chamber 28, which is relatively of less capacity than either of chambers 20 or 22, and at its outer end, through the collar 29, the passage is extended through air-duct 30 through the outer wall of the furnace jacket 7. The pipes 12, 14, 30, are each provided with a damper 31.

Through the outer wall 32 of the house, the cold air inlet pipe 33 is extended to and attached with the collar 34.

The arrow "a" indicates the direction of flow of cold air into the chamber 20; the arrow "b" shows the direction of the air through chamber 20 into chamber 22; and the arrow "c" shows that the fresh air may pass out through the duct 14 or 12.

The warm or hot air on leaving the furnace passes out of the opening 9 in the crown 10 through pipes (not shown) to the various rooms and in the customary way there is a return of relatively cooler air through pipe 35 as indicated by arrows "d" to and through the collar 36 secured to the air-box 15 and thence down through chamber 28, as still further shown by arrows "d," through duct 30 to within the influence of the heat of the furnace for re-circulation through the entire system.

The passage 21 and the specified construction of the box 15 serves to trap the incoming air against reversal of direction of movement thereof when there is sufficient velocity of wind outside the building.

In operation, it will be readily understood that the air at arrows "a" and "b" will be colder than when it reaches passage 21, by reason of the influence of furnace heat on the cover of the box 15 which will augment the flow of air. The thin metal partition 17, in practice, is of a lower temperature than the returning air (arrow "d") and will cause contraction or greater density of the air in chamber 28, with the result of increased rate of flow. The cooling or rapid lowering of temperature will facilitate movement of the air in the return-air pipe.

Preferably the air pipes have air-tight joints and the bottom of the furnace will not admit air into the apparatus. Suppose the doors and windows of living rooms are hermetically sealed, the temperature outside the building is below 60 degrees Fahrenheit, or during the "closed house" season, and sufficient heat present somewhere in the path of travel of the air to set up a circulation thereof, such living rooms are constantly supplied with fresh air and there is no "bad air" present in the rooms.

It has been demonstrated in practical use of my present invention that five square inches of atmospheric air inlet to one thousand cubic feet of space to be heated gives satisfactory results.

Obviously, the requisite amount of atmospheric air inlet will vary with the amount of air that escapes from the living rooms through doors, windows and other air exits anywhere in the apparatus. It will be noted the air receiver is of sufficient capacity to contain a relatively large volume of comparatively cold air which will tend to minimize fluctuation in the flow of incoming air, normally the source of heat not being sufficient to lift the two columns of air to permit backward movement of the atmospheric air in the air receiver.

An important feature of my invention is the construction of an air-box suitable to employ the lower temperature atmospheric air to increase the flow of air through the return-air duct 35, by the rapid contraction of the return air after it enters the chamber 28 which is caused by the relatively low temperature of the incoming atmospheric air passing through chambers 20 and 22. The rising atmospheric air in chamber 22 expands some by the heat from the furnace on the cover 16 of the box 15. The return air in chamber 28 is relatively colder and heavier after having passed along the colder partition wall 17, and thus is obtained a more prompt and complete transference of the heat from the fuel to the living rooms.

It will readily be understood that what is commonly termed a "cold air return" pipe from the living room or rooms is a necessary element in my improvement.

One advantage of admitting cool air through the pipe 12 into the dome of the furnace is to afford a plurality of cool atmospheric air inlets to supply a greater proportion of pure air to the system.

By my construction the pipe 35 and the return air passing downwardly therein is kept relatively cool and will facilitate the movement of the air in the system.

It is desirable to employ what is termed a gravity circulating system which is made possible by the air box shown and described in this specification, and which is readily attached to hot air furnaces on the market.

Having thus fully described my invention, what I claim as new and desire to secure by Letters Patent is:

1. In a heating apparatus, the combination with an atmospheric air-receiver vertically positioned and having a plurality of parallel air-passages therein and air trap therebetween and a return air passage, the air receiver having sufficient capacity to contain a comparatively large volume of relatively cold air, of a source of heat within an inclosure, means to supply atmospheric air from the air receiver to within the inclosure at a point above the source of heat, air ducts from the source of heat to the space to be heated and suitable return-air ducts from the space to be heated to the return-air passage of the air-receiver, and means to deliver return-air from said return-air passage to within said inclosure at a point below the source of heat.

2. In a heating apparatus, the combination with an atmospheric air receiver vertically disposed and having a plurality of parallel air passages therein and an air-trap therebetween and a return-air passage parallel with said first named air passages, the air-receiver having sufficient capacity to contain a large volume of relatively cold air, of a source of heat within an inclosure, an atmospheric air inlet to the air-receiver, air-inlets from the air-receiver to a point above the source of heat within the inclosure, suitable air ducts from the source of heat to the space to be heated, return-air means from the heated space to the return-air passage of the air-receiver, and air delivery means from the return-air passages of the receiver to and within the inclosure below the source of heat.

In testimony whereof I affix my signature in presence of two witnesses.

ERASTUS W. WOODS.

Witnesses:
C. RICHARD BETTS,
JAY A. COTELL.